US012716528B2

(12) United States Patent
Zhang

(10) Patent No.: US 12,716,528 B2
(45) Date of Patent: Aug. 25, 2026

(54) PREPARATION METHOD AND USE OF HYBRID COMPOSITE PIPES

(71) Applicant: Xiaodong Zhang, Hangzhou (CN)

(72) Inventor: Xiaodong Zhang, Hangzhou (CN)

(*) Notice: Subject to any disclaimer, the term of this patent is extended or adjusted under 35 U.S.C. 154(b) by 690 days.

(21) Appl. No.: 16/502,824

(22) Filed: Jul. 3, 2019

(65) Prior Publication Data

US 2019/0323634 A1 Oct. 24, 2019

Related U.S. Application Data

(63) Continuation of application No. PCT/CN2017/120459, filed on Dec. 31, 2017.

(30) Foreign Application Priority Data

Jan. 3, 2017 (CN) ......................... 201710000575.7

(51) Int. Cl.
*F16L 9/22* (2006.01)
*B32B 27/32* (2006.01)
(Continued)

(52) U.S. Cl.
CPC ................ *F16L 9/22* (2013.01); *B32B 27/32* (2013.01); *F16L 9/14* (2013.01); *B32B 1/00* (2013.01);
(Continued)

(58) Field of Classification Search
CPC ......... B32B 1/08; B32B 27/30; B32B 27/283; B32B 27/32; B32B 27/34; B32B 27/36;
(Continued)

(56) References Cited

U.S. PATENT DOCUMENTS 2,918,940 A * 12/1959 Carr ......................... F16L 58/16 524/68
3,333,025 A * 7/1967 Bader ..................... C08L 11/00 525/193

(Continued)

FOREIGN PATENT DOCUMENTS

CN 102515822 A * 6/2012
CN 203215110 U * 9/2013

(Continued)

OTHER PUBLICATIONS

Porous, THe Free Dictionary, 2003.*

*Primary Examiner* — Aaron Austin

(57) ABSTRACT

A preparation method of a hybrid composite pipe and applications thereof. By mixing and curing high polymers as a matrix with one or more types of porous lightweight aggregates or granules, the main body or structural layer of this composite pipe can combine with a variety of non-metal or metal materials as well as various types of metal or non-metal base pipes so as to prepare different hybrid composite pipes. The high polymers include the thermosetting high polymers and thermoplastic high polymers. The pipe can be prepared and molded by one or more processes of rolling, winding, pultrusion, centrifugal casting, extrusion, injection molding, resin transfer, and sandwiching. The pipe described herein can be applied to petroleum, natural gas, heat and gas supply, water supply and drainage, agricultural irrigation, mining, seawater desalination, electric power communication, municipal pipeline corridor and other purposes.

9 Claims, 2 Drawing Sheets

(51) Int. Cl.

| | |
|---|---|
| ***F16L 9/14*** | (2006.01) |
| *B32B 1/00* | (2006.01) |
| *B32B 9/04* | (2006.01) |
| *B32B 15/08* | (2006.01) |
| *B32B 27/08* | (2006.01) |
| *B32B 27/20* | (2006.01) |
| *F16L 11/08* | (2006.01) |

(52) U.S. Cl.
CPC ............... *B32B 9/045* (2013.01); *B32B 15/08* (2013.01); *B32B 27/08* (2013.01); *B32B 27/20* (2013.01); *B32B 2264/10* (2013.01); *B32B 2264/2031* (2020.08); *B32B 2597/00* (2013.01); *F16L 11/083* (2013.01)

(58) Field of Classification Search
CPC ....... B32B 27/38; B32B 1/10; B32B 2597/00; B32B 27/20; B32B 2264/10; B32B 9/047; B32B 2260/025; B32B 9/005; B32B 15/16; Y10T 428/139; Y10T 428/31511; Y10T 428/31725; Y10T 428/31786; Y10T 428/31913; F16L 11/04; F16L 9/22; F16L 9/14; B29D 23/00; B29D 23/001; C08L 2203/18; B29C 48/18
USPC ............ 428/36.9, 480, 474.4, 413, 447, 500
See application file for complete search history.

(56) References Cited

U.S. PATENT DOCUMENTS

| | | | | |
|---|---|---|---|---|
| 3,731,711 | A * | 5/1973 | Bauer | F16L 9/06 138/121 |
| 3,965,061 | A * | 6/1976 | Bash | C08K 3/22 525/139 |
| 5,006,573 | A * | 4/1991 | Plueddemann | C07F 7/1804 523/213 |
| 6,638,871 | B2 * | 10/2003 | Wang | H01L 21/76811 438/700 |
| 6,767,947 | B2 * | 7/2004 | Musch | C08F 36/18 524/270 |
| 2004/0166346 | A1 * | 8/2004 | Achten | C08L 15/005 152/565 |
| 2010/0132886 | A1 * | 6/2010 | Rodriguez | C09J 123/14 156/334 |
| 2010/0243097 | A1 * | 9/2010 | Jani | B29C 63/10 138/137 |
| 2012/0125470 | A1 * | 5/2012 | Nanney | F16L 11/087 138/125 |
| 2013/0134904 | A1 * | 5/2013 | Yau | H05B 45/385 315/297 |
| 2015/0175937 | A1 * | 6/2015 | Hernandez | C11D 3/042 510/511 |
| 2016/0318805 | A1 * | 11/2016 | Di Loreto | C04B 35/64 |
| 2017/0183503 | A1 * | 6/2017 | Otani | B32B 27/20 |

FOREIGN PATENT DOCUMENTS

| | | | | |
|---|---|---|---|---|
| CN | 203309389 | U | * | 11/2013 |
| CN | 103486355 | A | | 1/2014 |
| CN | 103554674 | A | | 2/2014 |
| CN | 103912737 | A | | 7/2014 |
| CN | 104356478 | A | | 2/2015 |
| CN | 104096535 | | * | 2/2016 |
| JP | 2598306 | B2 | * | 4/1987 |
| JP | H11323302 | A | * | 11/1999 |
| KR | 100626163 | B1 | * | 9/2006 |
| KR | 101632740 | B1 | * | 6/2016 |
| TW | 201620636 | A | * | 6/2016 |

* cited by examiner

PREPARATION METHOD AND USE OF HYBRID COMPOSITE PIPES

CROSS-REFERENCE TO RELATED APPLICATIONS

This application is a continuation of International Application No. PCT/CN2017/120459 with a filling date of Dec. 31, 2017, designating the United States, which claims priority to Chinese Application No. 201710000575.7 with a filling date of Jan. 3, 2017. The content of the aforementioned applications, including any intervening amendments thereto, are incorporated herein by reference.

TECHNICAL FIELD

The invention relates to a novel hybrid composite pipe and preparation method thereof. By mixing high polymers as a matrix with one or more types of porous lightweight aggregates or particles, the main body or structural layer of this hybrid composite pipe can combine with a variety of non-metal or metal materials as well as various types of metal or non-metal base pipes so as to prepare different hybrid composite pipes. The high polymers include the thermosetting high polymers and thermoplastic high polymers that can combine with the porous granule reinforcement.

BACKGROUND OF THE INVENTION

With the advancement of science, the composite pipe technology is also progressing with the times, and there successively come out aluminum-plastic composite pipe, plastic-steel pipe, PP-R copper pipe, plastic coated pipe, steel reinforced PE pipe and fiberglass reinforced plastic mortar pipe. Different from the simple performances of pure metal pipes and pure plastic pipes, these composite pipes are featured by unique merits and integrate the advantages of metal and non-metal pipes, especially for their significantly higher stiffness compared with the pipes of single materials. However, many deficiencies of these pipelines have also been reported during the practical applications. For example, the above-mentioned metal composite pipes are generally complained for such problems as their high costs, heavy pipe dead weight, large differences in thermal expansion coefficients for some materials as well as the disengaging tendency of the composite layer in response to significant temperature changes of environment and media. Providing the complicated application and installation environments, the metal composite pipes are susceptible to electric conduction, thermal conduction and corrosion even when guaranteed by the coated or lined plastic layer. In theory, all substances generate static electricity. The problem is that the static electricity generated by metals, which are different from insulating materials that can retain the charge, tends to leak. The occurrence of composite layer damages or fatigue cracks in metal composite pipes will certainly lead to a series of adverse factors and safety hazards, which, however, appears to be a common problem of metal composite pipes. As a relatively popular commercially available pipe, the co-extruded aluminum-plastic composite pipe is featured by light weight, durability and convenient construction and proves to be more suitable for the application in home decoration owing to its good bendability. The aluminum-plastic composite pipe consists of five layers, including the inner and outer layers made of polyethylene, the middle layer of thin aluminum, and the two layers of adhesive between these two materials to integrate these layers into a tight whole structure. Its superior performance lies in stable chemical properties, corrosion resistance, non-toxic and non-polluting features, smooth surface and inner wall, no scaling, light weight, free bending, good toughness, unique environmental protection and energy saving advantages. Nevertheless, due to the high requirements on materials and production processes, the market price remains high correspondingly. In addition, the pipe wall misalign caused by long-term thermal expansion and contraction may lead to leakage. Furthermore, as a result of any error in the selection of raw materials, chemical additives, production technique and production equipment, the aluminum-plastic composite pipe will fail to achieve five-layer co-extrusion and such composite pipes can be subject to the hidden dangers in quality, price and installation. The steel mesh reinforced PE pipe is similar to aluminum-plastic composite pipe in structure but replace the thin aluminum welded pipe layer with the porous steel welded pipe layer. With the high-density polyethylene as the matrix and the mesh steel pipe welded by perforated cold-rolled steel strips as the reinforcement, it is continuously compounded by extrusion molding, where the plastics in the inner and outer walls are integrated through the holes in the metal skeleton. The disadvantages of this pipe product include the easy separation and dislocation between plastic and metal skeleton as well as the unprocessable corrosion on the cut surface when connected to branch pipes. Plastic-lined aluminum pipe refers to the aluminum-alloy pipe lined with polyethylene or polypropylene and is an aluminum-plastic composite product consisting of two layers. Its disadvantage lies in the inability to use in corrosive environments considering the nature of aluminum. Plastic-lined galvanized steel pipe contains two types: one is lined with sprayed polyethylene, and the another is to fix the polyethylene via compounding extrusion inside the hot-dip galvanized steel pipe using the special interference fit process. However, unstuck lining coating, uneven lining, splitting and expensive costs are complained for the former type, while the latter is limited by the difficulty to solve the corrosion problem on the outer wall and end faces. Fiberglass reinforced plastic mortar pipe, known as a non-metal composite pipe, is characterized by excellent anti-corrosion performance as well as good resistance to high pressure and permeability, indicating its unique advantages among large diameter pipes. However, the granular material used in the compressive structural layer is natural mineral quartz sand. On the one hand, its mining can cause environmental damage; on the other hand, the natural performance of this mineral product is limited, which restricts the composite pipe in terms of advantageous plasticity and diversification. At the same time, if the quartz sand fails to be tightly combined with the resin matrix, creep rupture may occur, thus leading to delamination. In addition, the density of quartz sand is 2.65 kg/m$^3$, which can lead to high weight of the pipe body, thereby resulting in more inconvenience and wastes for the transportation and installation. The invention can prepare different hybrid composite pipes by combining the porous lightweight aggregates or granules with high polymers. This process makes full use of the intrinsic characteristics of porous lightweight aggregates or granules as well as the overall properties after integration with high polymers, thereby achieving improved pipe performance, reduced dead weight, enhanced combination degree of materials, lower costs, heat insulation and other advantages. In practice, porous lightweight aggregates or granules are used mainly in the preparation of lightweight aggregate concrete, insulation mortar and refractory concrete as well as such special purposes as insulation loose filler. Porous lightweight aggregates or granules can be either artificial or natural according to their formation conditions. These porous lightweight aggregates or pellets are widely available and not restricted to certain regions around the world. Of them, the raw materials for preparing the artificial category include shale, fly ash, coal gangue, silt, waste ore, desert sand, construction waste, etc., most of which are resource-recycling materials. The comprehensive utilization of such materials can greatly benefit the environment protection and resource conservation. With the advancement of technology in recent years, techniques for the artificial preparation of various high-strength porous lightweight aggregates or granules come into being one after another, which provides a good technical premise for the further development of the invention.

SUMMARY OF THE INVENTION

The invention provides a hybrid composite pipe by mixing a matrix of high polymers with porous lightweight aggregates or particles to compose a pipe main body or a structural layer. Different types of hybrid composite pipes can be compounded by combining with a variety of non-metal materials or various types of metal pipes. Owing to the high designability to combine different matrixes with artificial porous lightweight aggregates or granules of different properties, this hybrid composite pipe allows to produce various composite pipes according to the needs of practical applications by compounding with different materials. Apart from retaining the original advantages of similar composite pipes, this pipe can solve technical problems, such as the pipe dead weight, delamination, insulation, shading and heat insulation. In particular, providing the convenience and availability of the lightweight aggregates or granules, more beneficial advantages can be found in resource utilization, environmental protection and applicable areas. The artificial porous lightweight aggregates or granules are characterized by high designability. Therefore, according to the demands for pipe applications, the needs of different matrixes and the performance requirements, the granules can be produced via targeted design and preparation in terms of particle strength, particle size, number and size of pores on particle surface, bulk density and other parameters. Meanwhile, the ability to combine with different matrixes and materials fully reflect the designability and diversity of these composite pipes, allowing them to meet the requirements of different environments and industries. The porous lightweight aggregates or granules of the invention refer to those with a bulk density of less than 1200 kg/m$^3$, a porous and uneven surface, a large specific surface area and a good bonding interface with the high polymers. They can be both artificial and natural and include ceramsite, expanded perlite, glass microbeads, pumice, volcanic slag, cinder, mineral waste residue, porous sinter, light sand, porous plastic granules and other artificial lightweight granules, all of which meet the conditions of the particle size ≤15 mm, a large specific surface area, a large number of surface active atoms and strong interaction with high polymers. To blend the surface-treated porous lightweight aggregates or granules to molten high polymers can not only significantly enhance the impact performance of certain composite pipes but also improve the stiffness, toughness, strength, wear resistance and other physical and mechanical properties of composite materials. In addition, the intrinsic characteristics of particles, including light weight, low costs and thermal insulation, create favorable conditions for saving costs of raw materials, reducing pipe dead weight and expanding the application fields. In the embodiments, the involvement of at least one type of porous light aggregates or granules with the cylinder pressure ≥8 MP is preferred.

The high polymers of the invention refer to compounds (with relative molecular weight of greater than 10,000) composed of linked repeating bonds and include thermosetting and thermoplastic high polymers that can combine with porous granule reinforcements, such as thermoplastic plastics selected from PE, PP, PVC, PS, ABS, PEEK, PES, PASU, PPS, XLPE, m-PP and PB-1, thermosetting plastics selected from phenolics, epoxy, amino, unsaturated polyester, furane, polysiloxane, and PDAP plastics, rubbers selected from styrene butadiene rubber, butadiene rubber, isoprene rubber, ethylene propylene rubber and neoprene rubber, special rubbers selected from nitrile rubber, chlorinated rubber, fluororubber, epichlorohydrin rubber, silicone rubber, urethane rubber, polysulfide rubber, and acrylate rubber and fibers selected from glass fiber, aramid fiber, carbon fiber, polyester fiber/terylene, polyamide fiber/chinlon/nylon, polyvinyl alcohol fiber/vinyl, polyacrylonitrile fiber/acrylic fiber, polypropylene fiber/PP fiber, polyvinyl chloride fiber/PVC fiber, and other artificial synthetic and regenerated fibers). In the hybrid blending various plastics, rubbers and fibers with porous lightweight aggregates or particles, the content of high polymer or hybrid high polymer matrix should be ≥35%. As commonly used pipe materials, most of these high polymers are currently featured by mature technology and stable performance. The existing preparation processes and equipment provide a beneficial technical basis for the development of this hybrid composite pipe. In the embodiments of the invention, at least one high polymer material described above should be involved.

In an embodiment, the pipe main body is composed by combining the matrix of high polymer with the porous lightweight aggregates or granules. Specifically, this pipe is a non-metal composite pipe with the matrix distributed in the inner and outer surface layers. The cylinder pressure of the porous lightweight aggregates or granules is ≥8 MPa and the particle size is ≤10 mm; the thickness of the inner and outer surface layers is ≥0.5~5 mm and ≥0.2~2 mm respectively; the pipe diameter is 70-1000 mm; the content of matrix material in the hybrid layer is ≥35%. In order to meet the performance and application requirements, the hybrid structural layer of the main body can also mix the porous lightweight aggregates or granules with other pipe granules and materials, including short fiber materials and nano materials for the considerations of gradation optimization, weight ratio optimization and performance optimization. Pure high polymer pipes may suffer weakness in ring stiffness and impact resistance. The blending of the porous lightweight aggregates or granules can significantly improve the performance of those high polymer pipes by increasing the ring stiffness by about 20%, reducing the pipe dead weight by about 10% compared with pipes of the same thickness, and saving raw materials by more than 10%. When plastics and other polymer materials are exposed to sunlight or high-energy rays, the energy of ultraviolet rays, which appears to be higher than the activation energy of auto-oxidation reaction and the dissociation energy of chemical bonds in some polymers, is able to destroy the chemical bonds of polymers and trigger the auto-oxidation reaction, thus leading to aging degradation and resulting in product discoloration and performance reduction. The usual practice is to add an appropriate amount of carbon black light screening agent. The blended porous lightweight aggregates or granules can further insulate the pipe structure from the damages by light or high-energy rays and protect the inner pipe wall from microbial scaling caused by photosynthesis. Furthermore, the intrinsic thermal insulation feature of porous materials can keep the fluid contents from freezing, thereby allowing the pipe to work smoothly even under the stress of low temperatures.

In an embodiment, the pipe structural layer is composed by combining the matrix of high polymer with the porous lightweight aggregates or granules. Its feature is that the inner, outer or middle structural layers of the composite pipe can be made of all pipe raw materials that are able to combine with the matrix involved in the hybrid structural layer of the porous lightweight aggregates or granules and high polymer, including fibers, steels, high molecular materials, various homopolymers or copolymers.

Generally, composite pipes are composed of multiple structural layers. For example, reinforced thermoplastic pipe (RTP) is mostly produced in a three-layer structure, where the inner layer is a corrosion-resistant and wear-resistant polyethylene layer, the middle layer is a reinforced winding layer (the winding materials is high-strength synthetic fiber, glass fiber, carbon fiber or fine metal wire), and the outer layer is a protective polyethylene layer. For the structural layers of the thermosetting glassfiber reinforced plastic mortar pipe (RPMP), the inner layer is generally made of corrosion-resistant and wear-resistant resin plus fiber felt and winding fiber, the middle layer is a reinforced mortar layer mixing quartz sand and resin, and the outer layer is a fiber wound protective layer. In the invention, the pipe structural layer composed of the matrix of high polymers and porous lightweight aggregates or granules can replace the reinforcing layer used in the existing multi-layer composite pipes, such as the middle structural layers as described above in RTP and RPMP pipe. Nevertheless, it is not necessary to replace these reinforcing layers but depends on the needs of applications and the requirements to solve such performance problems as pipe dead weight, electric insulation, thermal insulation, structural performance and costs while meeting the basic pressure resistance and corrosion resistance. For the above-mentioned thermosetting glassfiber RPMP, for instance, replacing the original reinforcing layer mixing quartz sand and resin with the hybrid of unsaturated resin and the porous lightweight aggregates or granules can reduce the pipe dead weight by about 20% while maintaining or improving the original performance. At the same time, owing to the fact that the bonding interface of the porous lightweight aggregates or granules with resin is better than that of the quartz sand, thus allowing a great improvement in the overall structural performance of the pipe. Of course, in addition to replacing the structural layer of general composite pipes, it is also possible to prepare multi-layer hybrid composite structures according to the application requirements. For example, for the insulation, sealing and flame retardant purposes, the inner layer can be designed to be a binary mixture of corrosion-resistant and wear-resistant chlorinated polyethylene (CPE) and polyethylene (PE); the second layer can be a binary hybrid matrix formulated with the porous lightweight aggregates or granules; the third layer is a winding layer for reinforcing the compressive strength (the winding materials are high-strength synthetic fiber, glass fiber, carbon fiber and fine metal wire); and the outer layer is an HDPE protective layer. The related preparation method and process have been described in Example 2.

In an embodiment, provided is a hybrid composite pipe by blending the matrix of the high polymers with the porous lightweight aggregates or granules; and this pipe can combine with a variety of non-metal and metal pipes so as to prepare different hybrid composite pipes. Subject to the internal pressure resistance, wear resistance, frictional resistance and other application needs, such composite pipes are lined inside, outside or intermediately with different base pipes, including various steel pipes, plastic pipes, ceramic pipes, and composite pipes. Generally speaking, the pipe structures can be divided into three categories: 1) the outer layer comprises the thermoplastic high polymers or the fiber impregnated with resin, the middle structural layer is the matrix mixed with porous lightweight aggregates or granules, and the inner layer is lined with various pipes; for this type of pipeline, the lining base pipes are responsible for internal pressure resistance, while the structural layer of the matrix mixed with porous lightweight aggregates or granules is used to solve the problem of thermal insulation, especially in the case of hot/cold water delivery; 2) the inner layer is the high polymer, the second layer is composed of the matrix mixed with the porous lightweight aggregates or granules, the third layer is a variety of sandwich liners, and the outer layer consists of thermoplastic high polymers or the fiber impregnated with resin; this type of pipeline is designed mainly to solve the problems of insulation, fire prevention and static electricity prevention while strengthening the internal and external pressure resistance and impact protection, suggesting its outstanding competence in gas delivery; 3) the inner layer is made of high polymers, the middle layer is the matrix mixed with the porous lightweight aggregates or granules, and the outer layer is composed of various types of outside lining pipes; the main tasks of this pipeline is to solve the problems of internal thermal insulation, electric insulation and flow enhancement while strengthening the protection of the outer layer against UV and impact damages, indicating its suitability for oil and fat fluid delivery.

The technical solution of the invention provides the preparation method of a hybrid composite pipe, whose feature is that this composite pipe can be prepared and molded by one or more processes of rolling, winding, pultrusion, centrifugal casting, extrusion, injection molding, resin transfer, and sandwiching. In the process of implementing this technical solution, the co-extrusion is most suitable for the preparation of the hybrid of the thermoplastic high polymer and porous lightweight aggregates or granules, since multiple types of co-extrusion processes can be used to prepare multi-component composites in a variety of ways, suggesting that co-extrusion process is the easiest and most convenient alternative. The high-polymer co-extrusion process is a process used to obtain a multilayer composite product by pressing different melt material flows from several extruders and then conflating and co-extruding them through the same compounding extruder. It can combine multiple layers of materials with different properties during the extrusion process, thus allowing the product to integrate the excellent characteristics of these different materials and achieving a complementary performance, such as the oxidation- and moisture-resistant barrier property, colorability, thermal insulation, thermoforming and thermal bonding capabilities, as well as strength, stiffness, hardness and other mechanical properties. For the preparation of hybrid thermosetting high polymers and porous lightweight aggregates or granules, winding proves to be a relatively suitable preparation process. Spiral winding and hoop winding processes are performed from the inside to the outside successively in the pipe die. At present, two modes are available, that is, fixed length and continuous winding. The centrifugal process is a preparation process suitable for all kinds of high polymers. However, its relatively high requirements on equipment and processes predict its application to pipe production with special requirements. It is necessary to solve the following problems for the manufacturing process of the invention. 1) The combination of porous lightweight aggregates or granules with high polymers: in this regard, the invention requires porous or uneven granule surface, a large specific surface area and a good bonding interface with high polymers via the fine pores on granule surface. It is generally considered that the combination of granules with the matrix should first of all strengthened by sufficient specific surface area, as the larger the specific surface area of the granules, the better the interface bonding. Secondly, in order to realize a tight combination, internal bubbles should be removed. The usual practice is to discharge as many bubbles as possible by squeezing, vibrating and vacuumizing, which is also an extremely important process to ensure the pipe quality. In the invention, the specific surface area of the porous granule surface is large enough to form better bonding interface with high polymers; at the same time, a lot of gas with certain pressure, which is blocked within the countless and disordered fine pores that resemble countless small sealed chambers during the combination, can generate an adsorption force and stress during bonding with the matrix. Therefore, the porous lightweight aggregates or granules can be combined with the high polymers via an outstanding bonding interface owing to the fine pores on the granule surface; during the course, a better resistance is generated as a result of blocking the pressured gas, which can not only increase the stiffness of the pipe but also improve the bending and tensile strengths as well as the tensile and deflection moduli of elasticity. Compared with similar pipes, this feature allows the invented pipe to maintain sufficient high-performance characteristics while saving matrix materials. In order to achieve better performance of the hybrid composite pipe or meet the hybrid condition with a high polymer of poor compatibility or with several high polymers, the surfactant and coupling agent coating method is used in the invention. Specifically, the surfactant or coupling agent is added to a low-boiling solvent to form a solution at certain concentration, which is then dispersed uniformly in the porous lightweight aggregates or granules in a high-speed mixer at a certain temperature for the sake of surface modification; alternatively, the porous lightweight aggregates or granules react with an atomized surfactant or coupling agent at certain temperature to achieve surface modification; or, as another option, high polymers and a cross-linking agent or a catalyst can be dissolved or dispersed into a certain solvent, followed by an addition of the porous lightweight aggregates or granules and preparation by heating and stirring simultaneously. The coupling agent of the invention refers to a substance that can increase the interfacial adhesion of the high polymers to a filler or a reinforcing agent. The coupling agent molecule is a substance having an amphoteric structure, where one of its ends can react with chemical groups on the surface of inorganic materials to form strong chemical bonds while the other end is featured by an organophilic nature that can react with or physically wind organic molecules, thus firmly combining two materials of different properties. Commonly used coupling agents include silane coupling agents, titanate coupling agents, zirconium aluminates and complexes. Of them, silane coupling agents are the most widely applied type. Upon the chemical component conflict between the porous lightweight aggregates or granules and the high polymer matrix, or upon the low surface compressive strength or poor surface adhesion of the porous lightweight aggregates or granules, in order to meet the requirements for bonding with the matrix, the porous lightweight aggregates can be treated with surface modification through high-pressure spraying of unsaturated polyester resin added with organic bentonite, or through atomized spraying or direct mixing of the solution at certain concentration prepared by adding a surfactant or coupling agent to a low-boiling solvent. Meanwhile, organic bentonite, thickeners, binders, hot melt adhesives and other substances are added to the high polymers or between the structural layers to enhance the interception performance of the high polymer or between the structural layers. 2) The combination of the pipe structural layer comprising the matrix of high polymers and the porous lightweight aggregates or granules with other structural layers: it is highly recommended to select the same high polymer as the matrix of the structural layer. When different high polymers are combined, it is preferred to improve the bonding interface between them by selecting the high polymers with the potential to gain better compatibility via existing technologies or by adding mixed solvents, plasticizers, hot melt adhesives, etc. 3) The combination of the pipe structural layer comprising the matrix of high polymers and porous lightweight aggregates or granules with other lining pipes: first, surface treatment can be performed to the bonding surface of lining pipe using rolling or high energy beam machining devices to increase the wear resistance of the bonding surface; it is also feasible to directly select various types of the corrugated pipe as an alternative. Secondly, procedures in the combination process, such as extrusion, rolling vibration, prestressing and centrifugal casting, can be used to enhance the compactness of the bonding surface, thereby avoiding delamination.

The beneficial effects of the invention are embodied by the action realized through combining the properties of the porous lightweight aggregates or granules with the high polymers in the pipe. Firstly, after combining with the high polymer in the pipe, the porous lightweight aggregates or granules, which are featured by low density and fines pores in the surface, can not only reduce the pipe dead weight but also achieve higher ring stiffness and elastic moduli, better bonding interface and tighter overall structure, thus allowing to saving production costs while meeting the performance requirements. Its non-metal, corrosion-resistant, electric insulation, shading and thermal insulation properties expand its application coverage to flammable, explosive, freezable as well as various contaminated and complex environments. Secondly, it is possible to derive diverse composite pipes according to the application needs and the characteristics of different pipes, which well meets the development trend of light weight, diversification and environmental protection for composite pipes. Furthermore, the combination with different lining pipes can solve the problem of insufficient internal pressure resistance, thus avoiding those intrinsic defects of pure metal pipes and plastic pipes. Such porous lightweight aggregates or granules are convenient to collect and avoid the limitation of regional insufficiency. In particular, since the preparation technology of artificial porous lightweight aggregates or granules has been mature, porous granule products with different properties can be designed and produced according to the performance requirements of pipes, suggesting promising application prospect of the invention. Compared with the nanoparticulate materials, the porous lightweight aggregates or granules are much less expensive to use and the dead weight of prepared pipes is much lighter as well. The pipe described in the invention can be applied to petroleum, natural gas, heat and gas supply, water supply and drainage, agricultural irrigation, mining, seawater desalination, electric power communication, municipal pipeline corridor and the other purposes.

Figure 1:
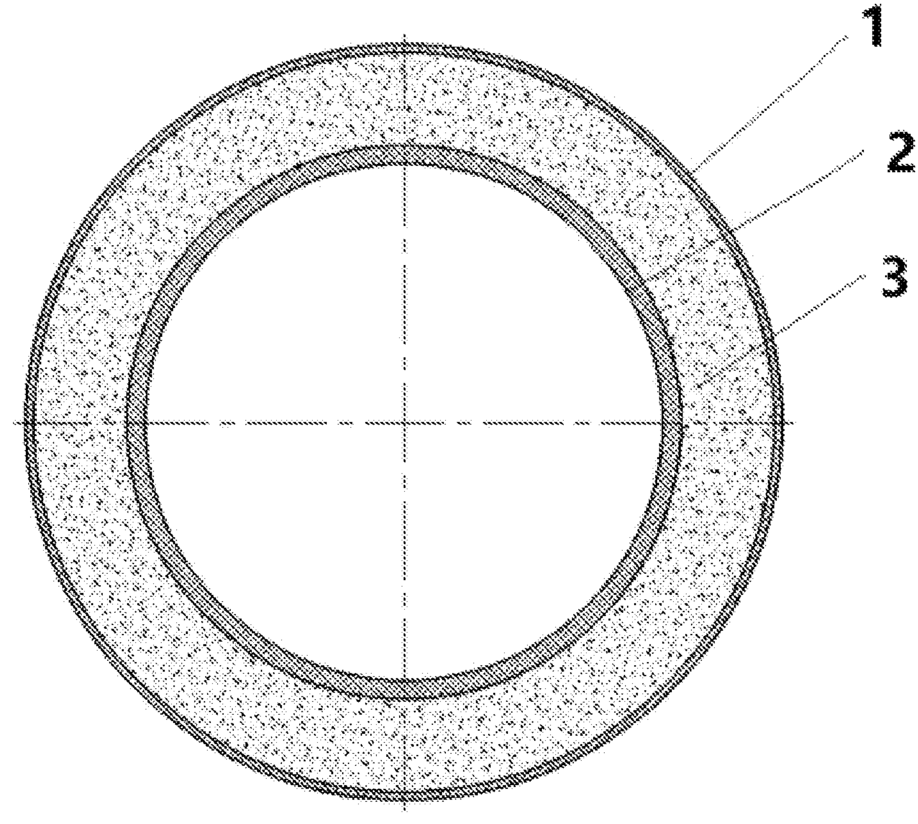
FIG. 1 is a schematic diagram showing a hybrid composite pipe according to an embodiment of the present invention.
Figure 2:
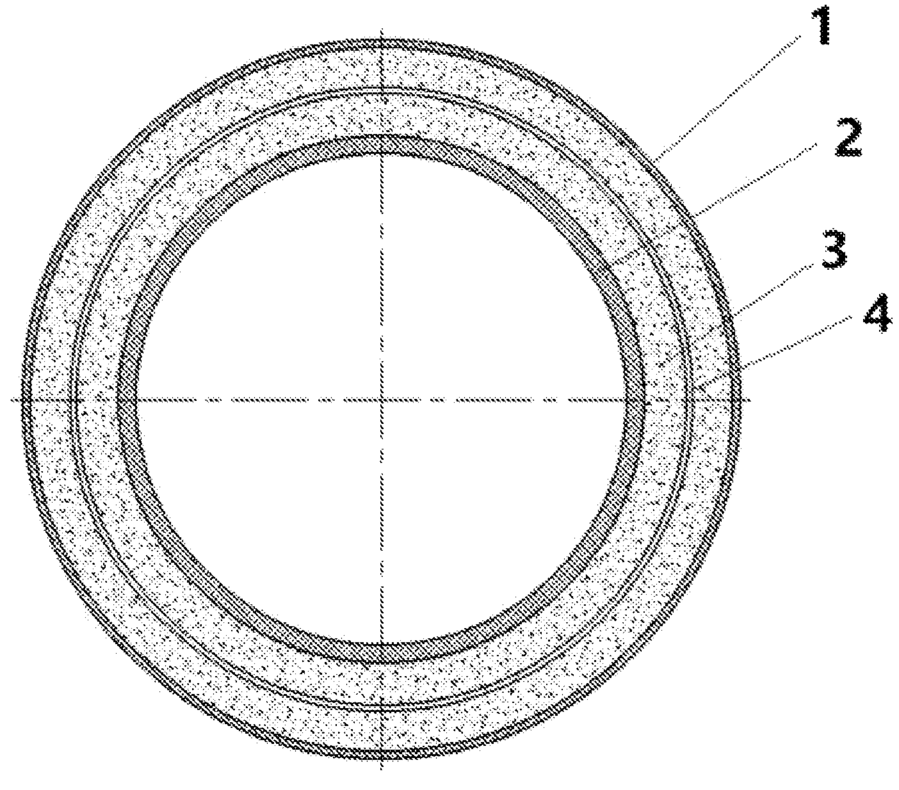
FIG. 2 is a schematic diagram showing the hybrid composite pipe according to another embodiment of the present invention.

In the drawings: 1, outer structural layer; 2, inner structural layer; 3, hybrid structural layer prepared by porous lightweight aggregates or granules and high polymers; 4, base pipe.

EMBODIMENTS OF THE INVENTION

The following embodiments are only intended to describe the invention in a more detailed way and to facilitate the understanding, but not to limit the scope of the invention.

Example 1

A hybrid composite pipe is prepared by combining porous lightweight aggregates or granules with PE.

Subject to the profile co-extrusion process, different plastic melt material flows supplied by several extruders are then pressed through the same extruder for confluence; as a result, high polymers of different properties are extruded into different parts of the same profile to form the multi-layer hybrid composite pipe.

(1) PE100 is selected as a raw material. High-strength porous ceramic sand, with plenty fine pores on the granule surface, has a particle size of ≤2 mm, a cylinder pressure is ≥8 MP. Gradation is designed as follows: particle size of 10~16 mesh, 30%; particle size of 16~20 mesh, 40%; particle size of 20~40 mesh, 20%; and particle size of 40~80 mesh, 10%. The high-strength porous ceramic sand is mixed with the PE100, where the volume percentage of PE100 in the mixture is 35%.

(2) After drying the high-strength porous ceramic sand, the silane coupling agent is evenly mixed with the high-strength porous ceramic by stirring, where standard amount=(filler amount*filler specific surface area)/the minimum coating area of the coupling agent; for the empirical amount, the volume percentage is about 0.1~3% of the granule stacking.

(3) Temperature conditions: the barrel temperature should be controlled within the range of 180-200° C., the temperature of the extruder shall be controlled within the range of 190-210° C., the temperature of the die should be controlled within the range of 200-220° C., and the temperature of the melt materials is no more than 200° C.

(4) Corresponding mold and sizing sleeve are selected according to the pipe design specifications; and the main engine, traction, and co-extrusion speed are set.

(5) Corresponding screw speed, melt pressure and discharge flow are set according to the pipe design specifications.

(6) The matched raw materials are loaded to the extruders corresponding to different layers according to the different compounding parts of the pipe.

(7) Products are manufactured according to preparation procedures of the profile co-extrusion process.

Example 2

The hybrid composite pipe is prepared by mixing porous lightweight aggregates or granules and chlorinated polyethylene (CPE) with PE100, aramid fiber or alkali-free glass fiber, PE80.

A co-extrusion process, a winding process and an extrusion process are employed, and accordingly, the profile co-extrusion, winding and compounding extrusion equipments are used.

(1) PE100 is mixed with CPE-135A. The weight percentage of PE-CPE mixture should be ≤60%, to which the cross-linking agent TEHC is added. The high-strength porous ceramic sand, with plenty fine pores on the granule surface, has a particle size of ≤2.5 mm. A cylinder pressure is ≥12 MP. Gradation is designed as follows: particle size of 10~16 mesh, 20%; particle size of 16~20 mesh, 40%; particle size of 20~40 mesh, 30%; and particle size of 40~80 mesh, 10%. A silane coupling agent at the volume ratio of 1.5% is added to the granules. The high-strength porous ceramic sand is mixed with the formulated matrix, where the volume percentage of matrix in the mixture is 35%. Aramid fiber or alkali-free glass fiber is selected.

(2) Temperature conditions: the barrel temperature should be controlled within the range of 110-160° C., the temperature of the extruder should be controlled within the range of 120-160° C., the temperature of the die should be controlled within the range of 120-170° C., and the temperature of the melt materials is no more than 180° C.

(3) Equipments and other production conditions are used according to the profile co-extrusion process.

(4) The inner layer composed of the formulated matrix and the second structural layer composed of the formulated matrix mixed with the high-strength porous ceramic sand are prepared according to the profile co-extrusion process.

(5) At the winding station, two reinforcing bands formed by spiral aramid fiber or alkali-free glass fiber are uniformly wound on the second layer of the pipe via the rotating unit of winding equipment, thus the third structural layer of the pipe is obtained.

(6) Subsequently, the outer protective layer are covered with PE80 via compounding extrusion on the basis of the third structural layer.

Example 3

The hybrid composite pipe is prepared by combining the base pipe of galvanized corrugated steel pipe and high-strength porous ceramic sand with PE100, alkali-free glass fiber, unsaturated polyester resin 190.

A centrifugal process and a winding process are employed, and accordingly, the centrifugal equipment and winding equipment are used.

(1) PE100, unsaturated polyester resin 190, alkali-free glass fiber and high-strength porous ceramic sand are selected as raw materials. The high-strength porous ceramic sand, with plenty fine pores on the granule surface, has a particle size of mm. A cylinder pressure is ≥8 MP. Gradation is designed as follows: particle size of of 10~16 mesh, 40%; particle size of 16~20 mesh, 40%; and particle size of 20~40 mesh, 20%.

(2) After drying the high-strength porous ceramic sand, the silane coupling agent are evenly mixed with the high-strength porous ceramic sand by stirring, where standard amount=(filler amount*filler specific surface area)/the minimum coating area of the coupling agent; for the empirical amount, the volume percentage is about 0.1-3% of the granule stacking. In the hybrid layer of high-strength porous ceramic sand and unsaturated polyester resin 190, the volume percentage of the unsaturated polyester resin 190 should be 35%.

(3) The galvanized corrugated steel pipe is located in the middle layer. The structural layers of the pipe from inside to outside are a PE inner layer, a hybrid layer A of high-strength porous ceramic sand and unsaturated polyester resin 190, a galvanized corrugated steel pipe, a hybrid layer B of high-strength porous ceramic sand and unsaturated polyester resin 190, and a protective layer of alkali-free glass fiber impregnated with unsaturated polyester resin 190. For the preparation processes, the PE inner layer and the hybrid layer A of high-strength porous ceramic sand and unsaturated polyester resin 190 are combined with the galvanized corrugated steel pipe using the centrifugal process; subsequently, the winding process is used to prepare the hybrid layer B of high-strength porous ceramic sand and unsaturated polyester resin 190 and the protective layer of alkali-free glass fiber impregnated unsaturated polyester resin 190.

(4) The galvanized corrugated steel pipe is located in the outer protective layer. The structural layers of the pipe from inside to outside are the PE inner layer, the hybrid layer of high-strength porous ceramic sand and unsaturated polyester resin 190, and the outer protective layer of galvanized corrugated steel pipe. The centrifugal process is applied throughout the course.

(5) The galvanized corrugated steel pipe is located in the inner protective layer. The structural layers of the pipe from inside to outside are the inner protective layer of galvanized corrugated steel pipe, the hybrid layer of high-strength porous ceramic sand and unsaturated polyester resin 190, and the outer protective layer of alkali-free glass fiber impregnated with unsaturated polyester resin 190. The winding process is applied throughout the course.

What is claimed is:

1. A hybrid composite pipe, comprising:

an outer layer;

an inner layer; and a main structural layer;

wherein the main structural layer is arranged between the inner layer and the outer layer; the outer layer and the inner layer are made from a first polymer or a metal base pipe; the main structural layer comprises a first hybrid structural layer, a base pipe and a second hybrid structural layer; the first hybrid structural layer is arranged between the inner layer and the base pipe, and the second hybrid structural layer is arranged between the base pipe and the outer layer; the first hybrid structural layer and the second hybrid structural layer each consist of a second polymer as a matrix with porous aggregates or granules that are modified with a surfactant, a coupling agent or a cross-linking agent; the porous aggregates or granules have a bulk density of less than 1200 kg/m$^3$, a particle size less than or equal to 15 mm, and a cylinder pressure greater than or equal to 8 MPa; wherein the porous aggregates or granules have pores on their surfaces; gas is blocked within the pores on the surfaces of the porous aggregates or granules by the second polymer the first polymer and the second polymer comprise thermosetting polymers and thermoplastic polymers; and at least one of the base pipe and the outer layer is a galvanized corrugated steel pipe.

2. The hybrid composite pipe of claim 1, wherein the porous aggregates or granules are selected from ceramsite, ceramic sand, expanded perlite, glass microbeads, pumice, volcanic slag, cinder, mineral waste residue, porous sinter, light sand, porous plastic granules and artificial or natural granules.

3. The hybrid composite pipe of claim 2, wherein the first hybrid structural layer and the second hybrid structural layer each consist of an unsaturated polyester resin and the porous aggregates or granules; and the porous aggregates or granules are porous ceramic sand.

4. The hybrid composite pipe of claim 1, wherein the first polymer and the second polymer each independently comprise thermoplastic plastics selected from PE, PP, PVC, PS, ABS, PEEK, PES, PASU, PPS, XLPE, m-PP and PB-1, thermosetting plastics selected from phenolics, epoxy, amino, unsaturated polyester, furane, polysiloxane, and PDAP plastics, rubbers selected from styrene butadiene rubber, butadiene rubber, isoprene rubber, ethylene propylene rubber, neoprene rubber, nitrile rubber, chlorinated rubber, fluororubber, epichlorohydrin rubber, silicone rubber, urethane rubber, polysulfide rubber and acrylate rubber, and fibers selected from glass fiber, aramid fiber, carbon fiber, polyester fiber/terylene, polyamide fiber/chinlon/nylon, polyvinyl alcohol fiber/vinyl, polyacrylonitrile fiber/acrylic fiber, polypropylene fiber/PP fiber, polyvinyl chloride fiber/PVC fiber, and synthetic and regenerated fibers.

5. The hybrid composite pipe of claim 1, wherein the first hybrid structural layer and the second hybrid structural layer are each produced by mixing the porous aggregates or granules with fiber materials and nano materials.

6. The hybrid composite pipe of claim 1, wherein the porous aggregates or granules are modified by a method comprising: adding the surfactant or the coupling agent to a low-boiling solvent to form a solution with certain concentration, and then uniformly dispersing the porous aggregates or granules in the solution in a high-speed mixer at a certain temperature; alternatively, reacting with an atomized surfactant or the coupling agent at a certain temperature; or, as another option, dispersing the cross-linking agent into a certain solvent, adding the porous aggregates or granules into the solvent, and treating the solvent by heating and stirring simultaneously.

7. The hybrid composite pipe of claim 1, wherein organic bentonite, thickeners, binders and hot melt adhesives are added to the first hybrid structural layer and the second hybrid structural layer.

8. The hybrid composite pipe of claim 1, wherein the hybrid composite pipe is prepared and molded by one or more processes of rolling, winding, pultrusion, centrifugal casting, extrusion, injection molding, prestressing, resin transfer, and sandwiching.

9. The hybrid composite pipe of claim 1, wherein the inner layer is a polyethylene (PE) layer, and the outer layer consists of glass fiber impregnated with a polyester resin.

* * * * *